United States Patent
Moon et al.

(10) Patent No.: US 8,879,446 B2
(45) Date of Patent: Nov. 4, 2014

(54) METHOD FOR TRANSMITTING A COMMON CONTROL CHANNEL, AND FEMTO BASE STATION FOR SAME

(75) Inventors: Sung Ho Moon, Anyang-si (KR); Jin Soo Choi, Anyang-si (KR); Han Gyu Cho, Anyang-si (KR); Jin Sam Kwak, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 13/320,900

(22) PCT Filed: May 17, 2010

(86) PCT No.: PCT/KR2010/003111
§ 371 (c)(1),
(2), (4) Date: Nov. 16, 2011

(87) PCT Pub. No.: WO2010/134733
PCT Pub. Date: Nov. 25, 2010

(65) Prior Publication Data
US 2012/0063403 A1    Mar. 15, 2012

Related U.S. Application Data

(60) Provisional application No. 61/179,021, filed on May 18, 2009.

(30) Foreign Application Priority Data

May 17, 2010    (KR) .......................... 10-2010-0045839

(51) Int. Cl.
| | | |
|---|---|---|
| H04B 7/00 | (2006.01) | |
| H04B 7/212 | (2006.01) | |
| H04W 4/00 | (2009.01) | |
| H04J 3/06 | (2006.01) | |
| H04W 72/04 | (2009.01) | |
| H04W 84/04 | (2009.01) | |

(52) U.S. Cl.
CPC ........ H04W 72/0406 (2013.01); *H04W 84/045* (2013.01)
USPC ......... 370/310.2; 370/324; 370/329; 370/350

(58) Field of Classification Search
USPC ............... 370/310.2, 321, 324, 328, 329, 350
See application file for complete search history.

(56) References Cited

U.S. PATENT DOCUMENTS

2008/0095122 A1    4/2008  Khandekar et al.
(Continued)

OTHER PUBLICATIONS

Yaghoobi, Hassan, "Mobile WiMAX Update and IEEE 802.16m" (Mar. 25, 2009), Intel Mobile Wireless Group, pp. 27-29.*

*Primary Examiner* — Melanie Jagannathan
(74) *Attorney, Agent, or Firm* — Lee, Hong, Degerman, Kang & Waimey

(57) ABSTRACT

The present invention relates to a femto base station. More particularly, the present invention relates to a method for transmitting a common control channel and to a femto base station for the same. The present invention relates to a method for transmitting a common control channel, comprising a step in which the femto base station acquires segment information from a macro base station which overlays the femto base station; a step of identifying, using the segment information, a time segment used by the macro base station in transmitting the common control channel; and a step of transmitting a common control channel of the femto base station on a time segment other than the time-segment identified in the previous step. The present invention also relates to a femto base station for the method.

12 Claims, 16 Drawing Sheets

(56) References Cited

U.S. PATENT DOCUMENTS

| | | |
|---|---|---|
| 2008/0181181 A1 | 7/2008 | Gorokhov et al. |
| 2008/0244148 A1 | 10/2008 | Nix et al. |
| 2009/0067378 A1 | 3/2009 | Luo et al. |
| 2009/0129332 A1* | 5/2009 | Dayal et al. .................. 370/330 |
| 2009/0137251 A1* | 5/2009 | Ji et al. ......................... 455/437 |
| 2010/0062779 A1* | 3/2010 | Bienas et al. ................. 455/446 |

* cited by examiner (a)

(a)

* Each of the PA-Preambles independently includes/does not include segment information

METHOD FOR TRANSMITTING A COMMON CONTROL CHANNEL, AND FEMTO BASE STATION FOR SAME

CROSS-REFERENCE TO RELATED APPLICATIONS

This application is the National Stage filing under 35 U.S.C. 371of International Application No. PCT/KR2010/003111, filed on May 17, 2010, which claims the benefit of earlier filing date and right of priority to Korean Application Serial No. 10-2010-0045839, filed on May 17, 2010, and also claims the benefit of U.S. Provisional Application Serial No. 61/179,021, filed on May 18, 2009, the contents of all of which are incorporated by reference herein in their entireties.

FIELD OF THE INVENTION

The present invention relates to a femto cell and, more particularly, to a method for transmitting a common control channel considering the femto cell and an apparatus for the same. The common control channel includes a synchronization channel and an essential control information channel.

BACKGROUND ART $2^{nd}$ generation mobile communication refers to performing audio to digital transmission and reception. Herein, $2^{nd}$ generation mobile communication includes CDMA (code Division Multiple Access), GSM (Global System for Mobile Communications), and so on. Also, GPRS (General Packet Radio Service) has been proposed as an evolved version of the GSM. Herein, the GPRS corresponds to a technology for providing packet switched data services based upon the GSM system.

$3^{rd}$ generation mobile communication refers to a communication technology enabling audio, video, and data transmission and reception. More specifically, 3GPP (Third Generation Partnership Project) has developed the mobile communication system (IMT-2000) technology and has adopted WCDMA (Wideband Code Division Multiple Access) as its Radio Access Technology (RAT). As described above, the IMT-2000 technology and the Radio Access Technology (RAT), e.g., WCDMA, are collectively referred to as a UMTS (Universal Mobile Telecommunication System) in Europe. Furthermore, UTRAN corresponds to an abbreviation for UMTS Terrestrial Radio Access Network.

Meanwhile, the $3^{rd}$ generation mobile communication is evolving to a $4^{th}$ generation mobile communication. The $4^{th}$ generation mobile communication proposes a Long-Term Evolution Network (LTE) technology, which is currently being standardized by the 3GPP, and an IEEE 802.16 technology, which is currently being standardized by the IEEE (Institute of Electrical and Electronics Engineers). The term E-UTRAN (Evolved-UTRAN) is used in the LTE. The $4^{th}$ generation mobile communication adopts OFDM (Orthogonal Frequency Division Multiplexing)/OFDMA (Orthogonal Frequency Division Multiple Access). The OFDM uses a plurality of orthogonal subcarriers. And, the OFDM uses a property of orthogonality between IFFT (Inverse Fast Fourier Transform) and FFT (Fast Fourier Transform). A transmitter performs IFFT on data, thereby transmitting the processed data. A receiver performs FFT on a received signal, thereby recovering the initial (or original) data. The transmitter uses IFFT in order to combine the plurality of subcarriers, and the receiver respectively uses FFT in order to separate (or divide) the multiple subcarriers.

DETAILED DESCRIPTION OF THE INVENTION

Technical Objects

Accordingly, an object of the present invention is to resolve the above-described problems and disadvantages. More specifically, the object of the present invention is to efficiently allocate radio resources between a femto cell and a macro cell. Most particularly, the object of the present invention is to efficiently allocating a common control channel between a femto cell and a macro cell. Furthermore, another object of the present invention is to efficiently allocate segments for a Synchronization Channel (SCH or A-Preamble) and a Broadcast Channel (BCH or Superframe header), among the common control channels.

Technical Solution

According to an aspect of the present invention, in a method used by a femto base station for transmitting a common control channel, provided herein is a method for transmitting a common control channel including the steps of having the femto base station acquire the segment information from a macro base station, the macro base station overlaying with the femto base station; using the segment information so as to identify a time-segment that is used by the macro base station for transmitting a common control channel; and transmitting a common control channel of the femto base station over a time-segment other than the identified time-segment.

In another aspect of the present invention, provided herein is a femto base station including an RF (Radio Frequency) unit configured to have the femto base station acquire segment information from a macro base station, the macro base station overlaying with the femto base station; and a processor configured to use the segment information, so as to identify a time-segment that is used by the macro base station for transmitting a common control channel and to transmit a common control channel of the femto base station over a time-segment other than the identified time-segment.

Herein, the segment information may be received through a backbone network with the macro base station. And, the segment information may be acquired by scanning a synchronization channel being transmitted by the macro base station.

Herein, the common control channel may include an SA-Preamble (Secondary Advanced Preamble) or a broadcast channel (e.g., Superframe Header).

Herein, the femto base station may further transmit a first superframe header for the macro base station. In this case, the first superframe may be transmitted over a time-segment, over which the macro base station transmits a superframe header.

Effects of the Invention

The present invention enables radio resources to be efficiently allocated between a femto cell and a macro cell. The present invention also enables a common control channel to be efficiently allocated between the femto cell and the macro cell. Furthermore, the present invention enables a synchronization channel and/or a broadcast channel to be efficiently allocated.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE PRESENT INVENTION

Figure 1:
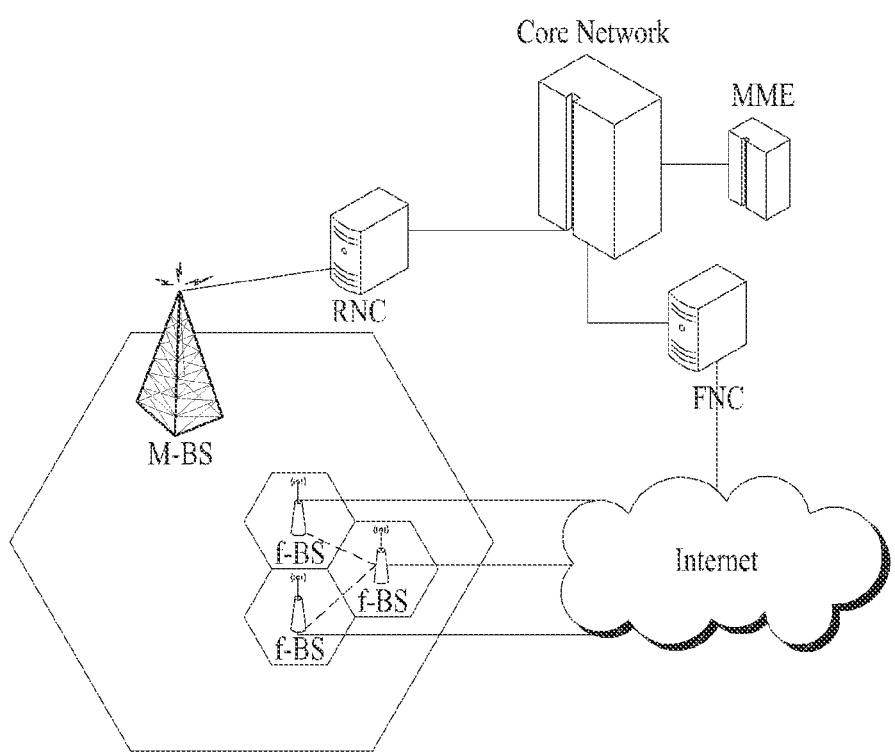
FIG. 1 illustrates an example of a related art femto cell based network structure.

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of" or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Furthermore, terms including numeric expressions, such as first ($1^{st}$), second ($2^{nd}$), and so on, used in the specification of the present invention may be used to described diverse elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

When an element is described as "being connected to" or as "accessing" another element, either the corresponding element may be directly connected to or accessing the other element, or yet another element may exist between the corresponding element and the other element. Alternatively, when an element is described as "being directly connected to" or as "directly accessing" another element, it should be understood that yet another (or a third) element does not exist between the two elements.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity. Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

In the $3^{rd}$ or $4^{th}$ mobile communication system, continuous attempts and effort are being made in expanding cell capacity in order to support high-capacity services, such as multimedia contents and two-way (or bi-directional) services. Attempts for expanding the cell capacity has been made by using high frequency bands and reducing cell radius. However, when applying cells having a small radius, such as pico cells, a frequency band higher than the frequency band used in the conventional cellular system. This is advantageous in that a larger amount of information can be transmitted. However, since a larger number of base stations should be established within the same surface area, this causes an increase in cost.

Among the many attempts to increase cell capacity by using such small cells, the usage of a femto cell has been recently proposed. A femto cell refers to installing an ultra small and compact and low power-consuming base station inside a house/office building so as to provide a small wireless environment. The femto cell can enhance service quality by improving indoor service-available areas and by increasing the cell capacity. And, by providing data services, the femto cell is expected to completely settle the next generation mobile communication system. With respect to the above-described femto cell, standardization is in process under the name of Home eNobeB in the 3GPP WCDMA and LTE group, and research on femto cells is also being actively carried out in 3GPP2.

Figure 2:
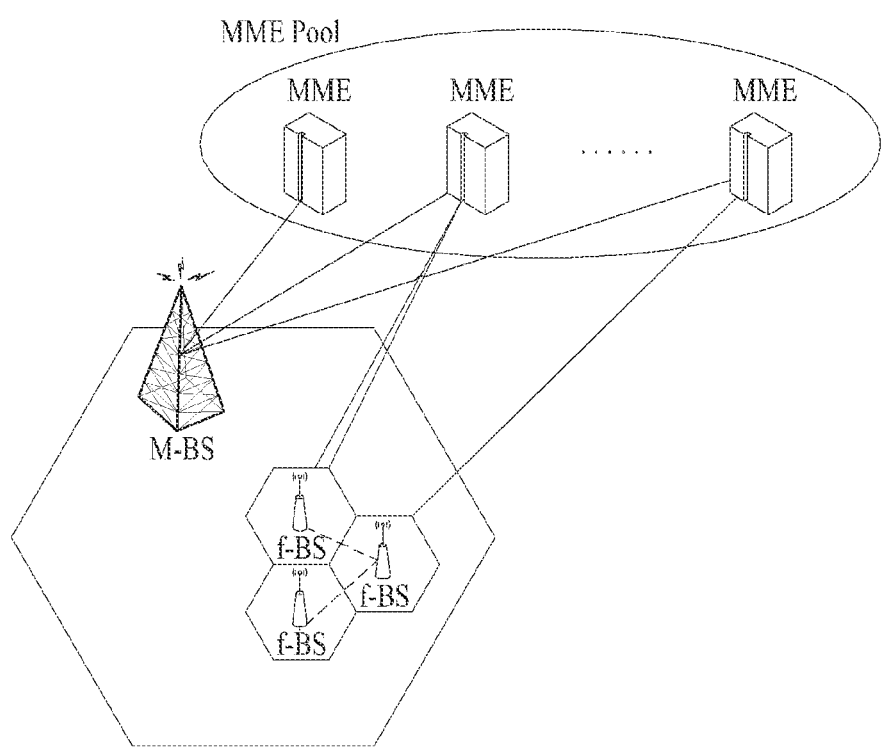
FIG. 2 illustrates another example of a related art femto cell based network structure.

With respect to a method of realizing such femto cells within a conventional mobile communication network, diverse structures are being proposed, as shown in FIG. 1 and FIG. 2.

FIG. 1 illustrates an example of a related art femto cell based network structure. A Macro Base Station (M-BS), which provides services to broad regions, and a plurality of Femto-BSs (f-BSs) being installed on a user-basis are shown in FIG. 1. Herein, the Femto-BS (f-BS) is controlled by being connected to a Femtocell Network Controller (FNC) through the Internet, thereby providing services to a user.

A User Equipment measures signals of neighboring cells and delivers the measurements to its f-BS. Then, the f-BS uses the received measurements to recognize and manage the presence (or existence) of the neighboring cells within its surroundings. Also, the f-BSs may exchange information to and from one another via direct link or via indirect link through the FNC. Furthermore, the f-BS and the M-BS may exchange information to and from one another through the FNC and an RNC (Radio Network Controller) or through an MME (Mobility Management Entity), which controls the f-BS in a mobile communication system.

FIG. 2 illustrates another example of a related art femto cell based network structure. As shown in FIG. 2, Femto Base Stations (f-BSs) may exchange information to and from one another via direct link or through an MME, unlike as shown in FIG. 1. Furthermore, a Macro Base Station (M-BS) and a Femto Base Station (f-BS) may exchange information to and from one another through an MME.

Figure 3:
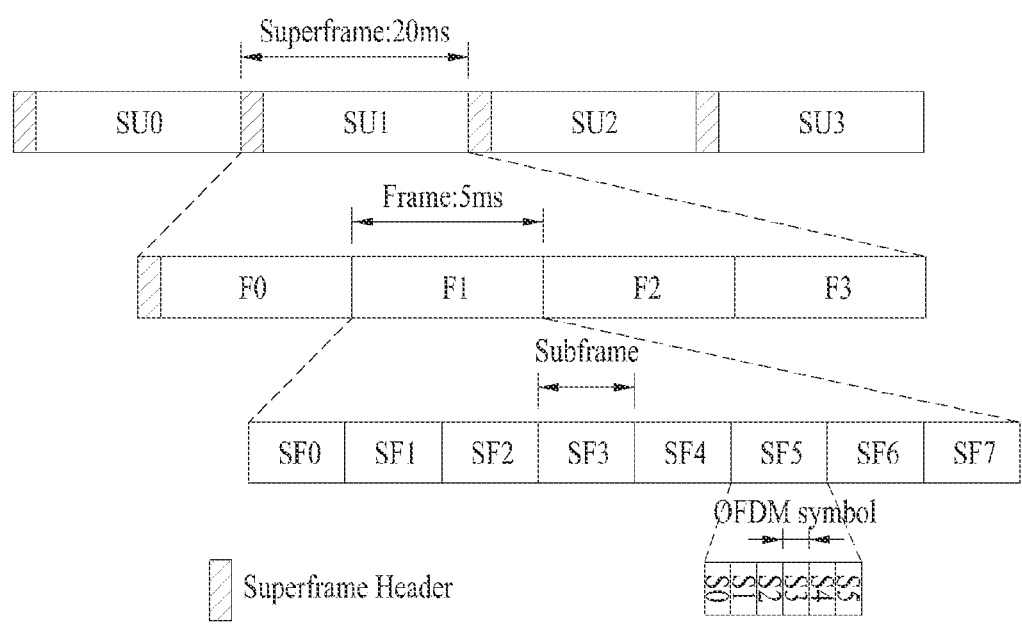
FIG. 3 and FIG. 4 respectively illustrate a related art superframe structure.

FIG. 3 illustrates an exemplary related art frame structure being used in a femto cell and a macro cell. Referring to FIG. 3, each Superframe is divided into 4 Radio frames each having the same size. A Superframe may include a Superframe Header (SFH). The SFH includes essential control information that must absolutely be acquired when the user equipment performs initial network access or handover. And, the SFH performs a similar function as the Broadcast channel (BCH) in the LTE technology. The SFH may be allocated to a first radio frame among the plurality of radio frame configuring the superframe. A number of subframes configuring one frame may vary from 5, 6, 7, and 8 depending upon a bandwidth of the system or Cyclic Prefix (CP) length. And, a number of OFDMA symbols configuring one subframe may also vary from 5, 6, 7, and 9 accordingly. FIG. 3 illustrates an example of a case where the bandwidth is 5, 10, or 20 MHz and where a CP length is ⅛Tb (Herein, Tb refers to a Useful OFDMA symbol time).

The exemplary frame structure shown in FIG. 3 may be applied in a TDD (Time Division Duplexing) scheme or in a FDD (Frequency Division Duplexing) scheme. In the TDD scheme, the overall frequency band is configured for an uplink or a downlink, while an uplink transmission and a downlink transmission are differentiated from one another within a time domain. In the FDD scheme, an uplink transmission and a downlink transmission each occupies a different frequency band, and the uplink transmission and the downlink transmission occur simultaneously.

Each subframe is divided into at least one Frequency Partition. Each Frequency Partition consists of at least one Physical Resource Unit (PRU). Each Frequency Partition includes a Localized PRU and/or a Distributed PRU. Each Frequency Partition may be used for the same purpose as a Fractional Frequency Reuse (FFR).

A Physical Resource Unit (PRU) corresponds to a basic physical unit for resource allocation including N number of consecutive (or contiguous) OFDM symbols and P number of consecutive (or contiguous) subcarriers. A Logical Resource Unit (LRU) corresponds to a basic logical unit for a distributed allocation and a localized allocation. The LRU includes P number of subcarriers*N number of OFDM symbols.

Figure 4:
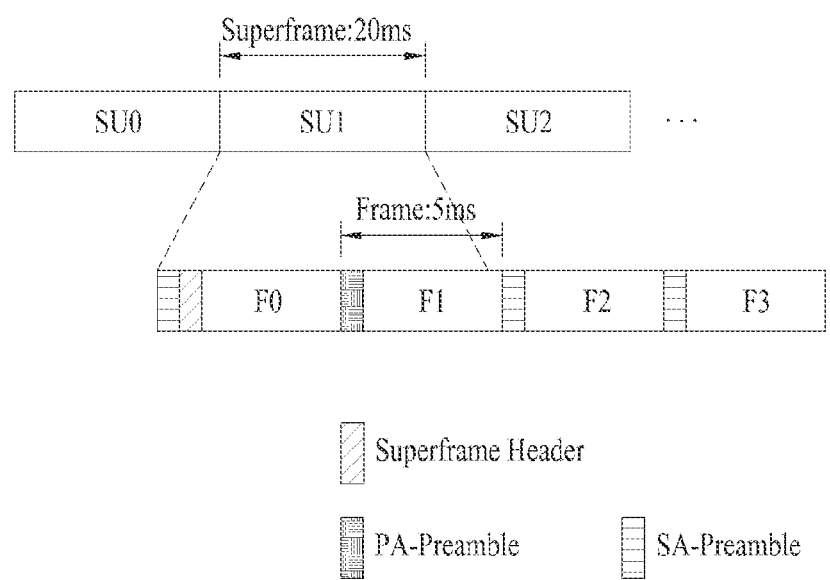

FIG. 4 illustrates structures of a synchronization channel and a superframe header of an IEEE 802.16m (or an Advanced Air Interface), which corresponds to one of the $4^{th}$ generation mobile communication system technologies. The synchronization channel is transmitted for each frame and is repeated (or iterated) in superframe units. The synchronization channel includes a primary synchronization channel and a secondary synchronization channel. A signal that is being transmitted through the synchronization channel is referred to as an Advanced-Preamble (A-Preamble), and a Primary A-Preamble (PA-Preamble) and a Secondary A-Preamble (SA-Preamble) are respectively transmitted to the primary synchronization channel and the secondary synchronization channel. The transmission positions of the PA-Preamble and the SA-Preamble may be located as shown in FIG. 4. The SFH, through which the essential control information is transmitted, is transmitted after a symbol of a first ($1^{st}$) SA-Preamble. Herein, the PA-Preamble is transmitted as frequency reuse 1, and the SA-Preamble is transmitted as frequency reuse 3. Therefore, in case of the SA-Preamble, 3 different types of segments are allocated by one-to-one (1:1) mapping in accordance with 3 different sector indexes. In the example given herein, the PA-Preamble is shown to be located in the second frame. However, in the present invention, there will be no limitation in cases where the PA-Preamble is positioned in the first, third, or fourth frame.

In the description of the present invention, a segment includes a frequency-segment and a time-segment. The frequency-segment includes a sub-band, which is divided from an available frequency band of the system. For example, the frequency-segment includes a PRU sub-band, which is divided from an available Physical Resource Unit (PRU). Also, the time-segment includes a time-section, which is generated (or created) by dividing a frame (e.g., superframe). For example, the time-segment includes an OFDM symbol (or OFDM symbols) divided from a superframe. A whole segment may be configured to be either consecutive (or contiguous) or non-consecutive (or non-contiguous) in the corresponding resource area. Unless specified otherwise, the frequency-segment and/or the time-segment will be collectively referred to as a segment for simplicity.

Figure 5:
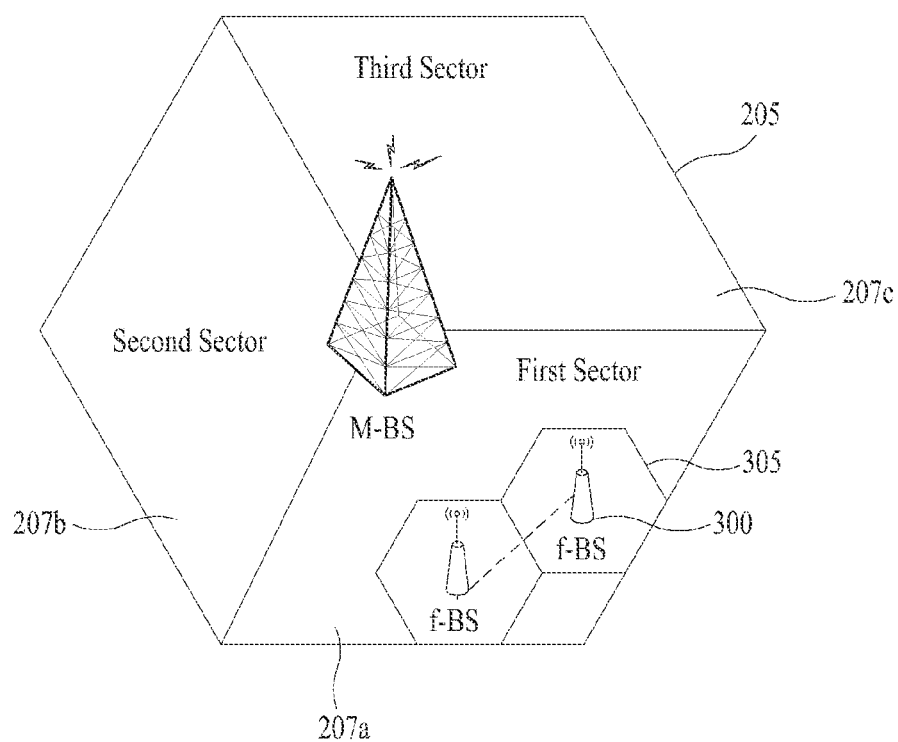
FIG. 5 illustrates a structure showing a femto cell and a macro cell.

FIG. 5 illustrates a structure showing a femto cell and a macro cell.

As shown in FIG. 5, a cell (205) formed by a Macro Base Station (M-BS) (201) includes a plurality of sectors (207a, 207b, and 207c). A sector refers to a region that is formed by a directional antenna of a macro cell (502), and, for example, three sectors (207a, 207b, and 207c) may be included. Meanwhile, a segment is defined as a group (or collection) of Physical Resource Units (PRUs). When it is assumed that a frequency band of 5 MHz is being used, 24 Physical Resource Units (PRUs) with 5 MHz may be divided into 3 segments, and each segment may use 8 Logical Resource Units (LRUs). Generally, one segment is configured by being mapped to one sector at a one-to-one (1:1) correspondence. However, the number of segments and the number of sectors may be different from one another. And, in this case, the mapping between segments and sectors may vary depending upon the cell planning of the manufacturer. In the description of the present invention, it will be assumed that the communication system according to the present invention corresponds to a communication system having 3 segments and 3 sectors mapped at a one-to-one correspondence.

Meanwhile, each femto cell (305) shown in FIG. 5 fixedly uses one sector and also uses one of the three segments. The frequency-/time-segments used in the femto cell (305) may be actively decided by a femto Base Station (f-BS) (300).

However, as shown in FIG. 5, if a femto cell (305) located in the first sector (207a) of the macro cell (205) uses the first segment, which is mapped to the first sector, just as the macro cell (205), an interference may occur between the macro cell (205) and the femto cell (305).

Most particularly, since the femto Base Station (f-BS) (300) is installed at an installation point, which is decided by the user, it is difficult to efficiently manage or to avoid such interference with the macro cell (205). Such interference has the same effect on a channel (essential control information channel) carrying essential control information, such as a superframe header (or BCH). Since the essential control information channel includes information that can be commonly used by all user equipments, such as system information, the influence caused by interference may lead to a very critical defect (or obstruction) when the user equipment performs initial network access or when the user equipment performs a handover.

Figure 6:
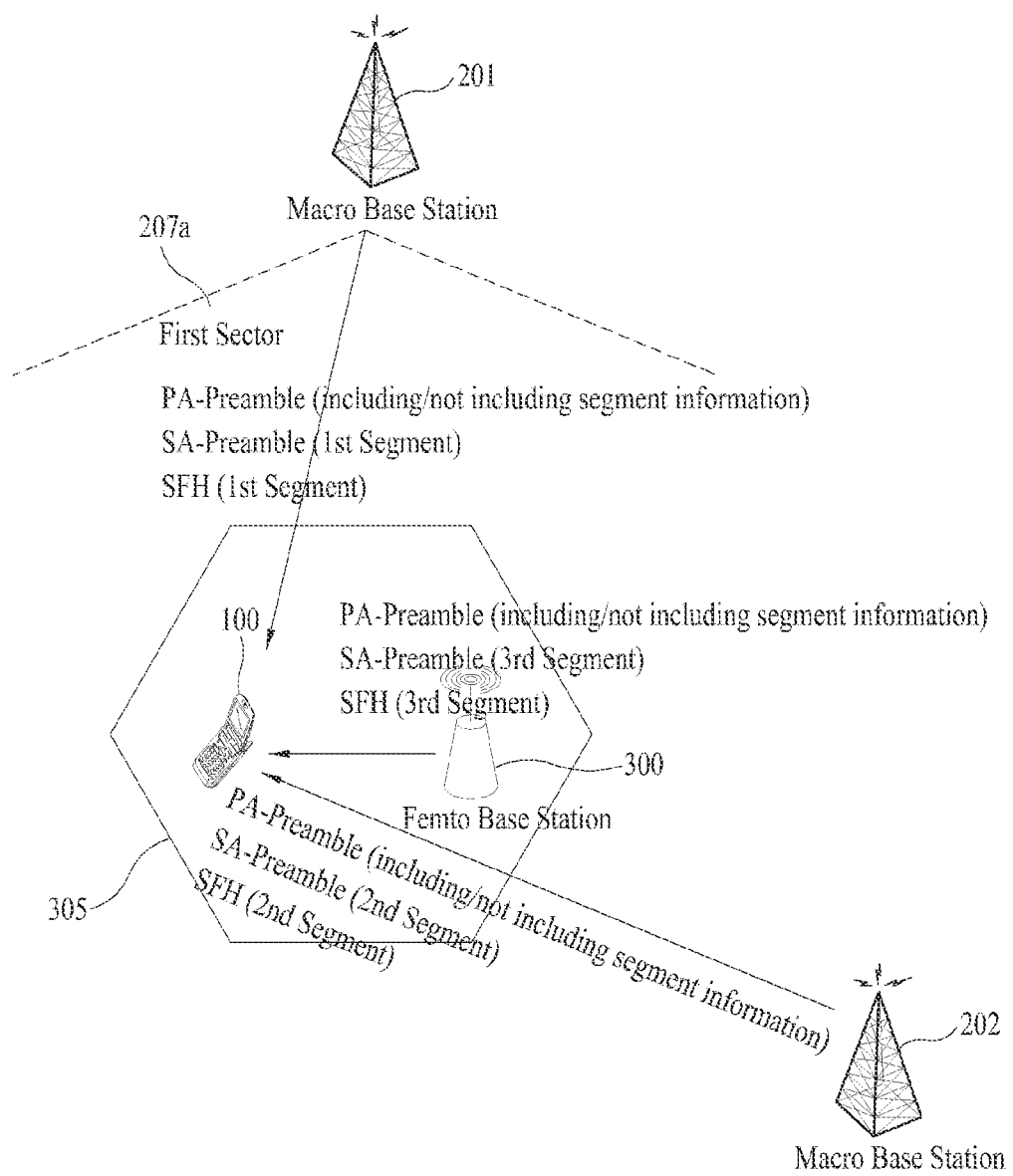
FIG. 6 illustrates an example showing a common control channel relation between a femto cell and a macro cell according to the present invention.

FIG. 6 illustrates an exemplary method for resolving (or eliminating) a downlink channel interference between a femto cell and a macro cell according to the present invention. Referring to FIG. 6, a mobile communication system includes a first macro base station (201), a second macro base station (202), a femto base station (300), and a user equipment (100). The user equipment (100) is located in the first sector (207a) of the first macro base station (201), which corresponds to a donor base station, and the user equipment (101) also exists in a femto cell (305) formed by the femto base station (300). A service respective to the user equipment (101) may be provided by the first macro base station (201) and/or the femto base station (300). The two base stations that cause the largest interference to a downlink channel of the femto base station (300) are the first macro base station (201), which is the donor base station, and its neighboring second macro base station (202).

In FIG. 6, the femto base station (300) uses one segment for the transmission of an SA-Preamble and the transmission of a superframe header (SFH). At this point, one femto base station (300) may use one appropriate segment among, for example, the three segments. The superframe header, which is used in the first sector (207a) of the macro cell (205) in the exemplary case of FIG. 5, causes an interference with the first segment of the femto cell (305). Therefore, it is preferable that the femto base station (300) uses a segment other than the first segment. It is preferable that the usage of a segment in order to avoid such interference is applied to a Common Control Channel.

The Common Control Channel includes a Synchronization Channel (SCH) and an essential control information channel (or a Broadcast Channel (BCH)). The SCH includes a P-SCH (Primary-SCH) and an S-SCH (Secondary-SCH). In the $4^{th}$ generation communication technology, the synchronization channel is referred to differently for each technology. For example, in the LTE technology, the SCH is referred to as an SS (Synchronization Signal). In the IEEE 802.16e, the SCH is referred to as a preamble. And, in an AAIF (Advanced Air Interface) of the IEEE 802.16m, the SCH is referred to as an advanced-preamble or an A-Preamble. The A-Preamble includes a PA-Preamble (Primary Advanced Preamble) and an SA-Preamble (Secondary Advanced Preamble). Meanwhile, the essential control information channel or broadcast channel is also referred to as a Superframe Header in the IEEE 802.16m.

The PA-Preamble may, for example, transmit a transmission band, sector information, or grouping information of a cell identifier (ID). The SA-Preamble (Secondary-Sync Channel) is used for a cell identifier transmission. A complete cell identifier may be identified by the combination of a PA-Preamble and an SA-Preamble. In a base station type (e.g., macro base station, femto base station, etc.), i.e., in case a transmitting end and a transmitter perform transmission/reception through a plurality of communication carriers in order to enhance a transmission data rate, the grouping information included in the PA-Preamble may indicate a type of the carrier through which the PASA-Preamble and the SFH are being transmitted.

For example, the PA-Preamble may indicate the sector information of the macro cell and the femto cell. For example, 2 bits of the PA-Preamble may indicate 3 macro sectors and one femto sector. Also, the PA-Preamble that is being transmitted from the macro base station may indicate the type of the macro base station, and the PA-Preamble that is being transmitted from the femto base station may indicate the type of the femto base station. Furthermore, the PA—Preamble that is being transmitted from the macro base station and the femto base station may indicate a bandwidth uses by the macro base station and the femto base station.

In another example, a case where the PA-Preamble transmits only the bandwidth and the type of transmission carrier may be considered. More specifically, information associated to a sector or information associated to macro/femto may not be included in the PA-Preamble. In this case, information on sector and segments that are used by the current macro base station for performing transmission may be acquired from the cell identifier, which is acquired from the SA-Preamble.

The PA-Preamble, the SA-Preamble, and the SFH are required to be adequately allocated to the first macro base station (201) and the femto base station (300). Hereinafter, this will be described in detail.

First of all, a description of the PA-Preamble will be made as follows. The first macro base station (201) may transmit information on a corresponding sector (207a) of the macro base station over the PA-Preamble. Also, a case of having no sector information over the Pa-Preamble may also be considered.

The femto base station (300) may scan and receive sector information that is transmitted to the PA-Preamble by the first macro base station (201). Alternatively, in case the sector information is not transmitted to the PA-Preamble, a cell identifier may be acquired from the SA-Preamble, thereby acquiring sector information used by a donor macro base station.

Meanwhile, the femto base station (300) may be directly connected to the first macro base station (201) and a Backbone network without having to pass through a scanning process, or the femto base station (300) may be connected to the first macro base station (201) and the Backbone network through a core network, thereby being capable of acquiring sector information (including frequency-/time-segments information) of the macro base station (otherwise referred to as the donor base station). Also, the femto base station (300) may also acquire sector or segment information included in the SFH of the first macro base station (201) without having to pass through a scanning process.

As described above, when the case of having sector information transmitted to the PA-Preamble is being assumed, the femto base station (300) may transmit sector information, which is identical to that of a macro base station (otherwise referred to as the donor base station) overlaying with the femto base station (300) itself, over the PA-Preamble. In this case, a PA-Preamble sequence being transmitted by the femto base station (300) may be different from a PA-Preamble sequence used by the macro base station (201). Instead of sector information of the donor base station, the femto base station (300) may transmit its own sector information over the PA-Preamble. More specifically, the femto base station (300) may actively decide the segment that is to be used by the femto base station (300) itself. And, then, the femto base station (300) may transmit its own sector information in accordance with the decided segment through the PA-Preamble. In case the PA-Preamble does not transmit the sector information, the femto base station (300) may not transmit sector information over the PA-Preamble as well. In this case, the PA-Preamble sequence of the femto base station (300) may be identical to a PA-Preamble sequence of the first macro base station (201). However, the significance of the identity between the two PA-Preamble sequences refers to an identity in light of differentiating the sector information. And, different information is included in the PA-Preamble, the femto base station and the macro base station may each have a different sequence. As described above, the reason for which the femto base station (300) transmits identical sector information of the donor macro base station over the PA-Preamble is to gain a Macro Diversity effect. More specifically, since a femto or a macro cell included the corresponding femto transmits the same PA-Preamble sequence, a user equipment belonging to the femto cell is capable of receiving the same sequence from two different sites.

Hereinafter, an SA-Preamble and an SFH will now be described in detail. The macro base station (201) transmits an SA-Preamble carrying SFH information in a segment corresponding to a transmission sector and carrying cell identifier (ID) information in a segment of the SA-Preamble corresponding to a transmitted sector. A physical segment for SFH transmission and a physical segment for SA-Preamble transmission may be different from one another. Herein, the two physical segments being different from one another may signify that a physical identification method indicating $0^{th}$, $1^{st}$, and $2^{nd}$ segments of the SA-Preamble and a physical identification method dividing $0^{th}$, $1^{st}$, and $2^{nd}$ segments of the SFH may be different from one another.

Based upon the sector information of the first macro base station (201), which is acquired by performing the above-described scanning or non-scanning method, the femto base station (300) may transmit cell ID information over an SA-Preamble of a different segment. This is to reduce the influence of interference by configuring the sector within the first macro base station (201) and the segment of the femto base station (300) to be different from one another (i.e., in the exemplary case of FIG. 5, since the femto base station is located in the first sector of the macro base station, the interference level is low in the second segment and the third segment).

After acquiring two segments having large influence levels caused by interference through a scanning method or a method other than the scanning method, it may be considered that the femto base station (300) transmits an SFH and an SA-Preamble through the remaining segments, excluding the two segments having large influence levels caused by interference. Herein, the two segments having the large influence levels caused by interference may correspond to the donor macro base station and another neighboring macro base station, or may correspond to the donor macro base station and a neighboring femto cell.

Alternatively, a case where the SFH is transmitted without dividing the segments and where only the SA-Preamble is transmitted after dividing the segments may be considered. More specifically, the SFH may set the frequency reuse to '1', so that transmission can be performed in the whole system band. In such case, in the receiving perspective of the SFH, since a problem of interference may occur between the macro base station and the femto base station, after acquiring the information on the position of an available SFH within a superframe by using the above-described scanning method or any method other than the scanning method, a method of positioning the SFH at a position having less interference. Conversely, a case of dividing the SFH and transmitting the divided SFH and transmitting the SA-Preamble without dividing the segments is also being considered. In this case, the SA-Preamble and its cell ID information may be transmitted through the same physical position within the first macro base station (201), i.e., the whole band of the system.

Figure 7:
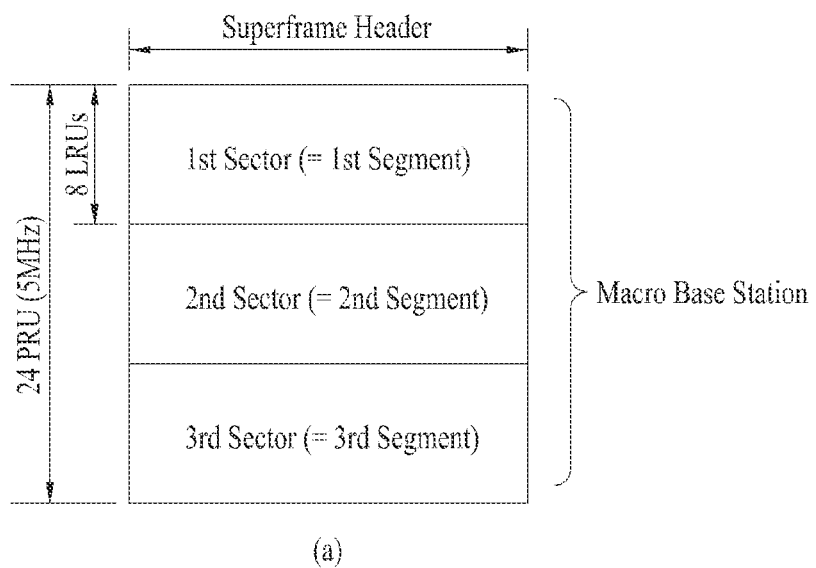
FIGS. 7~11 respectively illustrate frame structures for transmitting a common control channel over different frequency-segments according to an embodiment of the present invention.
Figure 7:
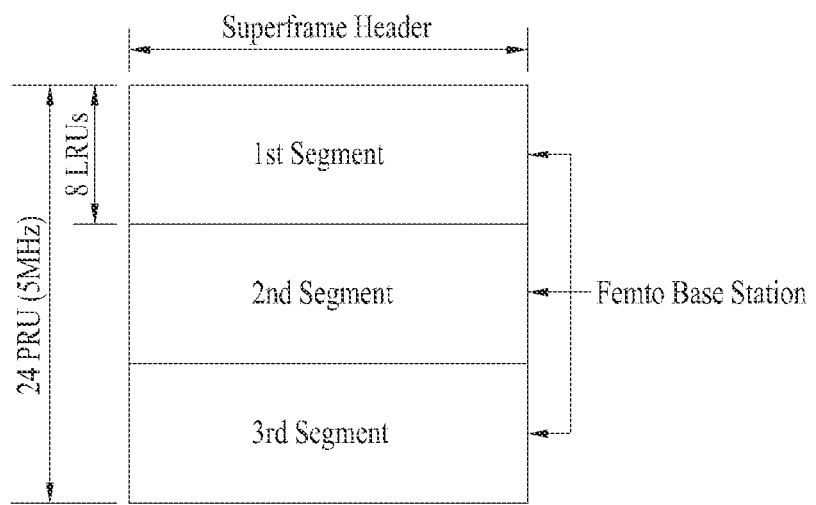

FIG. 7 illustrates a solution for resolving (or eliminating) interference of a Common Control Channel according to an embodiment of the present invention. Herein, the Common Control Channel includes a synchronization channel (e.g., A-Preamble, SCH) and an essential control information channel (e.g., BCH, SFH).

Referring to FIG. 7, a macro cell includes a plurality of sectors, for example, a first sector to a third sector, and the macro cell uses a segment respective to the corresponding sector so as to transmit a common control channel. In this case, in order to avoid interference with the macro cell, a femto cell may use different frequency-segments that are differentiated from the macro cell in the frequency domain, so as to transmit the common control channel. Referring to the case of FIG. 6, the donor macro base station (201) may use a first frequency-segment with respect to user equipments within the first sector, so as to transmit the common control channel. Meanwhile, the femto base station (300) located in the first sector (207a) of the macro cell (205) may use a segment, which is used by the donor base station (201) and/or a neighboring macro base station (202), and a third frequency-segment, which is identified from the frequency domain, so as to transmit the common control channel. Based upon the segment information of the macro base station, the segment that is used by the femto base station for transmitting the common control channel may be actively decided by the femto base station, or may be indicated (or designated) by the macro base station.

Hereinafter, referring to FIGS. 8-11, a method of transmitting a synchronization channel and an essential control information channel by using a frequency-segment, which identifies a macro cell and a femto cell from one another in the frequency domain, will now be described in detail. In order to facilitate the understanding of the present invention, the SA-Preamble and the superframe header (SFH) shown in FIG. 6 will be respectively given as the main examples of the synchronization channel and the essential control information channel. Also, to facilitate the description of the present invention, it is assumed that, according to this embodiment of the present invention, the first macro base station (201) and the femto base station (300) are positioned as shown in FIG. 6. In this embodiment of the present invention, a segment for the SFH and a segment for the SA-Preamble may be identified as being physically identical to one another. Additionally, a segment for the SFH and a segment for the SA-Preamble may be identified as segments being physically different from one another yet configured to be identical to one another only logically.

Figure 8:
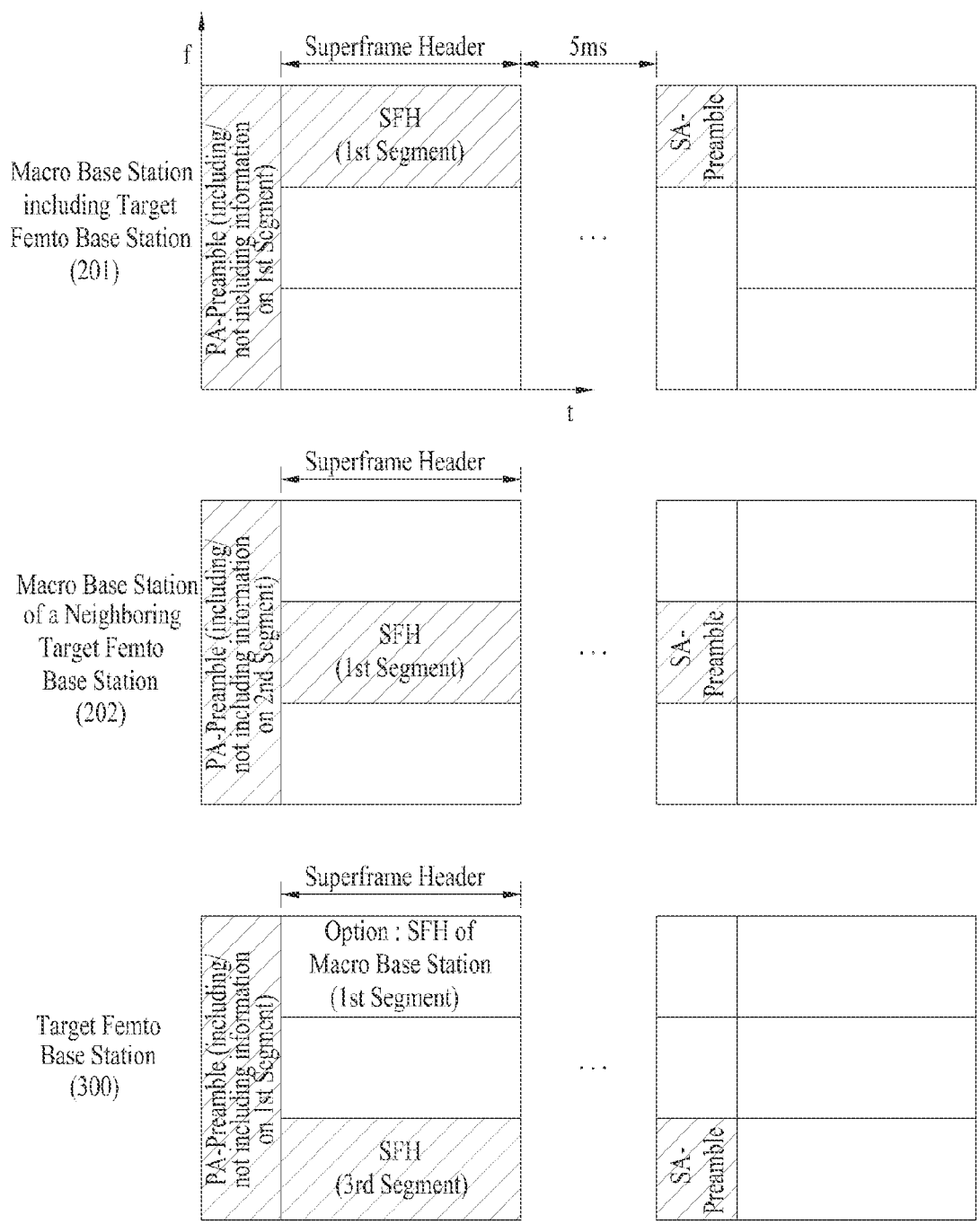
Figure 9:
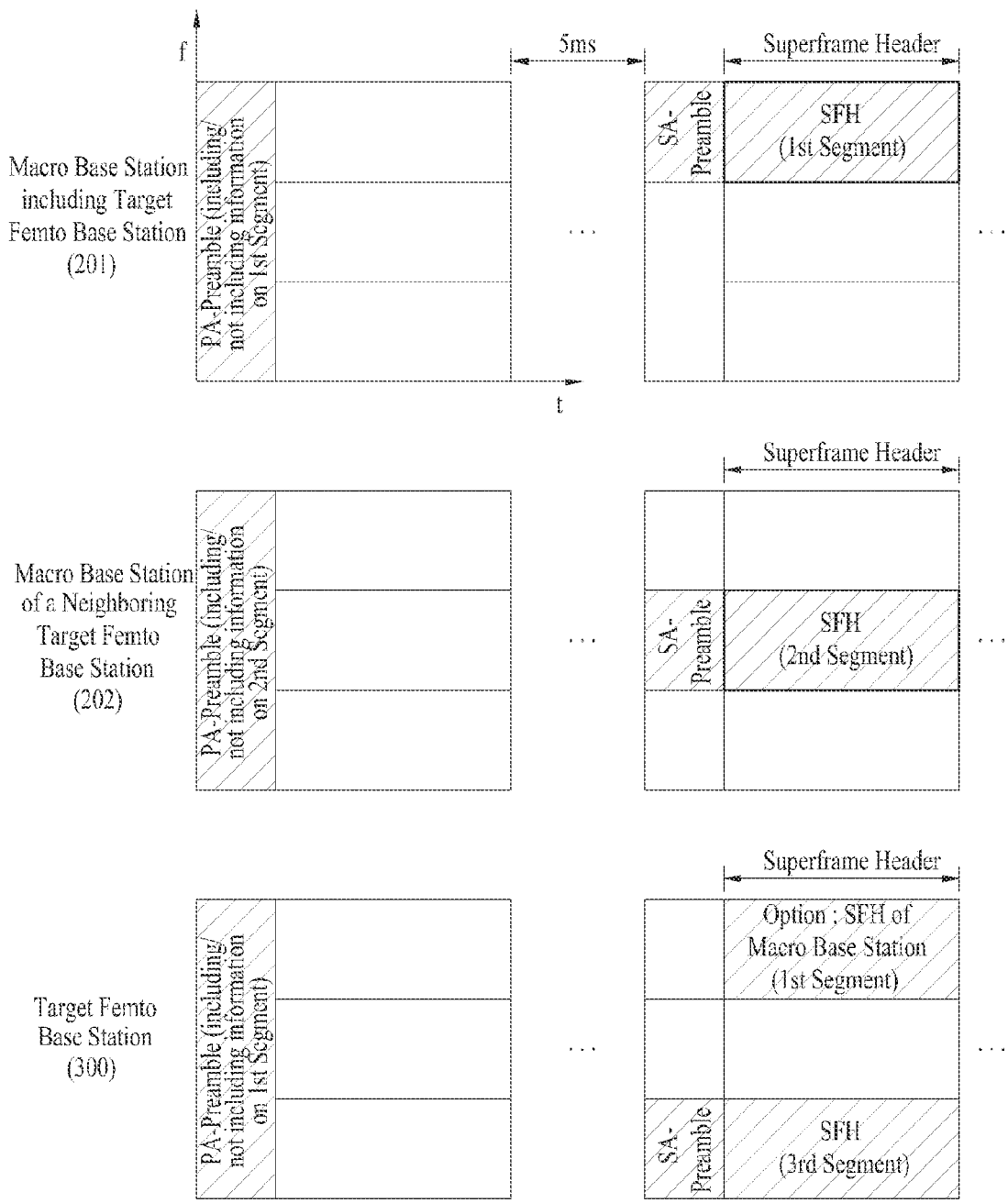

FIG. 8 and FIG. 9 illustrate examples of a frame structure according to the present invention.

Referring to FIG. 8, the first macro base station (201) including a target femto base station may transmit a PA-Preamble for the first sector (including/not including information on the first segment) from all Physical Resource Units (PRUs) along a frequency axis and from a first subframe (or some of the symbols) along a time axis within the superframe.

In case of FIG. 8, the first macro base station (201) may transmit the SFH to a first frequency-segment for the first sector (207a). Furthermore, the first macro base station (201) may transmit an SA-Preamble from the first frequency-segment, which is divided for the SA-Preamble.

FIG. 9 illustrates an example of an SFH not being transmitted from the same frame as the PA-Preamble but being transmitted from the same frame as the SA-Preamble. As described in FIG. 8, the first macro base station (201) transmits the SFH to the first frequency-segment for the first sector (207a). And, the first macro base station (201) may transmit an SA-Preamble from the first frequency-segment, which is divided for the SA-Preamble.

Meanwhile, another second macro base station (202), which is located in the surroundings of a target femto cell, may transmit a PA-Preamble for the second sector (including/not including information on the second segment). And, the second macro base station (202) transmits an SFH for the second sector to the second frequency-segment for the SFH. Furthermore, the second macro base station (202) transmits an SA-Preamble from the second frequency-segment, which is divided for the SA-Preamble.

In the meantime, description will be made on the present invention under the assumption that the femto base station (300) is positioned within the first sector of the first macro base station (201), as shown in FIG. 6.

The femto base station (300) may transmit a PA-Preamble (including/not including information on the first segment) for the same sector as the donor first macro base station (201). And, in order to avoid the interference between the SFH of the donor first macro base station (201) and the SFH of its neighboring second macro base station (202), the femto base station (300) may transmit its own SFH to a third frequency-segment within the superframe. At this point, the femto base station (300) may optionally transmit the SFH of the first sector of the donor first base station (201), in which the femto base station (300) is located, over the first frequency-segment (option). Also, among the frequency-segments that are divided for the SA-Preamble, in order to avoid interference between the SA-Preamble of the donor first macro base station (201) and the SA-Preamble of its neighboring second macro base station (202), the femto base station (300) may transmit the SA-Preamble from the third frequency-segment.

Figure 10:
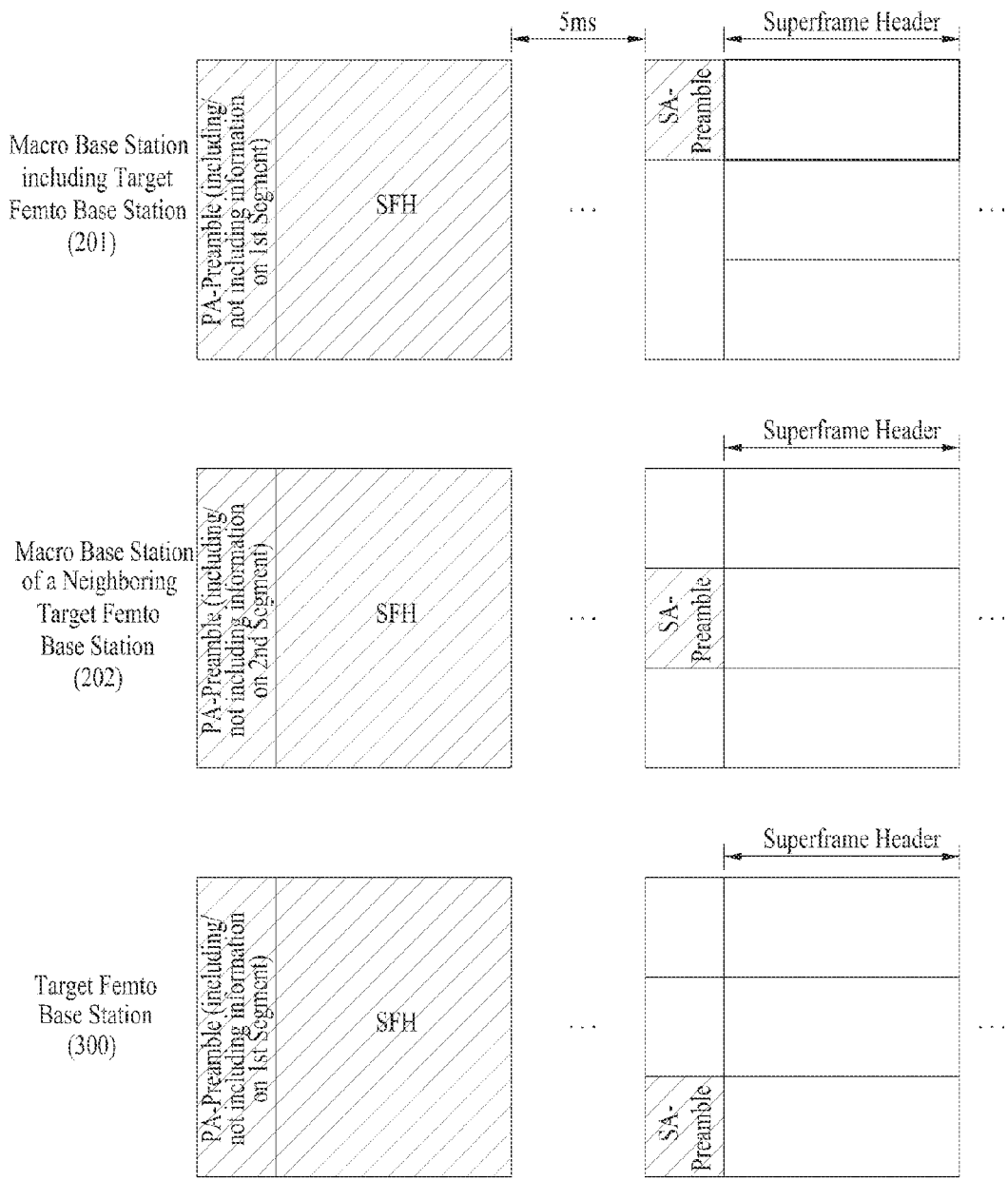
Figure 11:
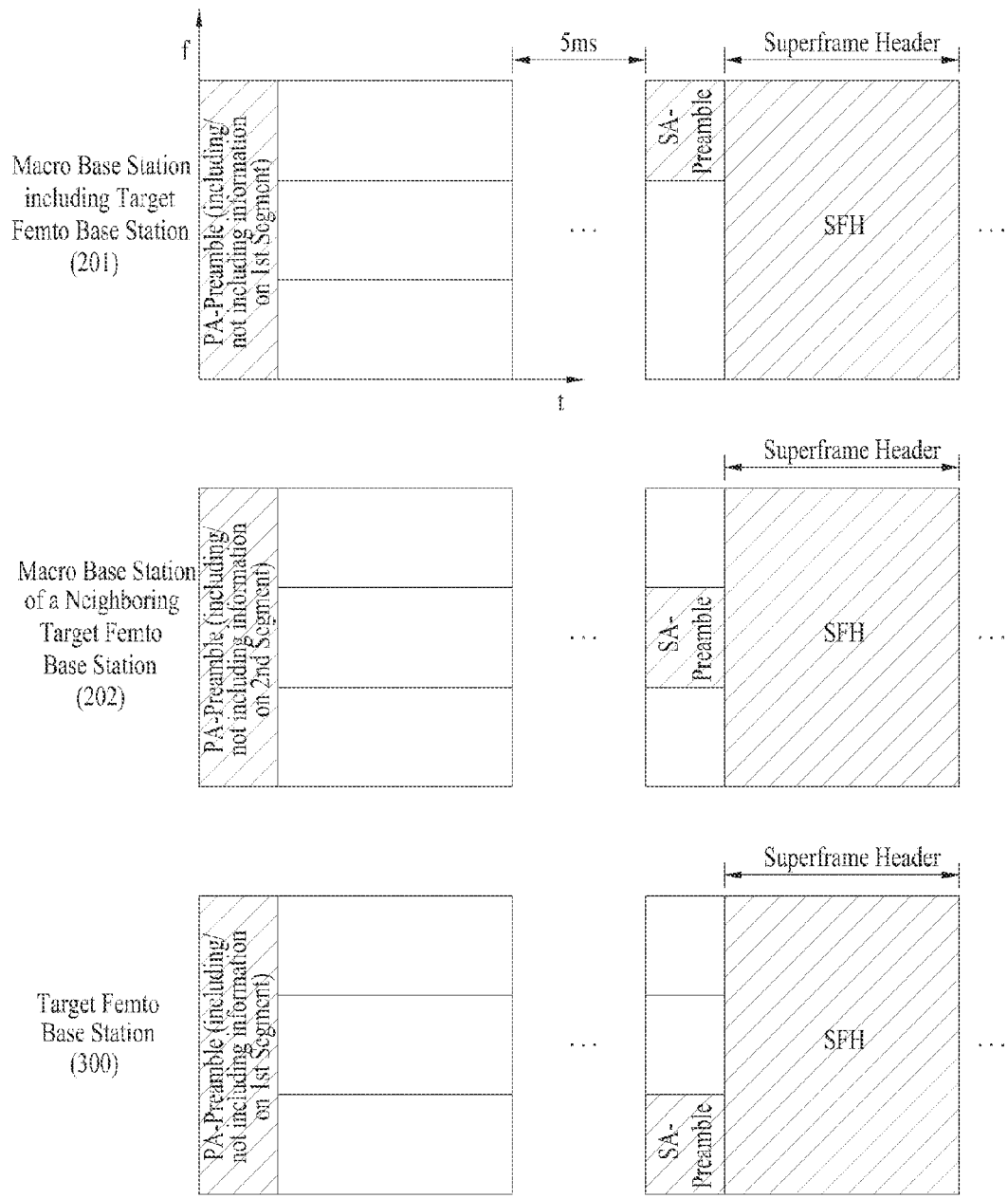

FIG. 10 and FIG. 11 illustrate examples of a frame structure according to another embodiment of the present invention. Herein, the difference between FIG. 10 and FIG. 11 is the identification according to a position of the SFH.

Referring to FIG. 10 and FIG. 11, unlike as described in FIG. 8 and FIG. 9, according to the other embodiment of the present invention, the SFH may use all Physical Resource Units (PRUs) along the frequency axis within the superframe. In this case, among the description of FIG. 8 and FIG. 9, the description of the Sa-Preamble is identically applied herein. However, since interference may occur between the macro base station and the femto base station, due to the SFH being transmitted through the whole transmission band, a method for avoiding such interference is required, and a method of varying the time-segment for such method may be taken into consideration.

Figure 12:
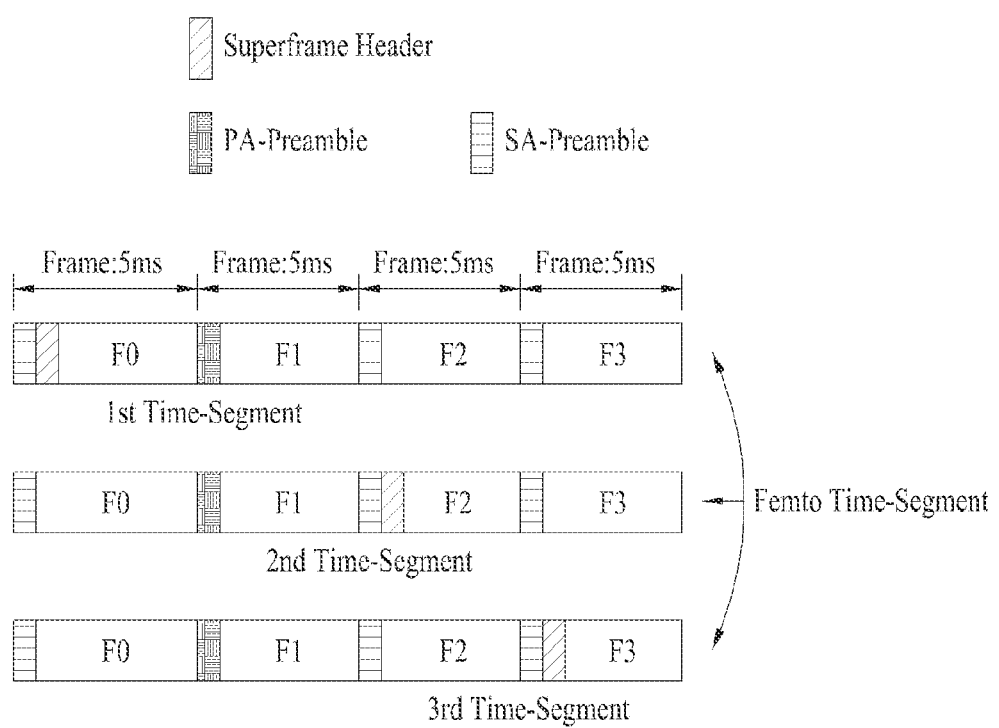
FIGS. 12~15 respectively illustrate frame structures for transmitting a common control channel over different time-segments according to an embodiment of the present invention.

FIG. 12 illustrates another method for resolving (or eliminating) interference of the common control channel according to the embodiment of the present invention. The common control channel includes a synchronization channel (e.g., A-Preamble, SCH) and an essential control information (e.g., BCH, SFH).

Referring to FIG. 12, a macro cell includes a plurality of sectors, for example, first sector to third sector, and a macro base station uses a time-segment respective to the corresponding sector so as to transmit the common control channel. In this case, in order to avoid interference with the macro cell, the femto cell may use different time-segments (e.g., first~third time-segments), which are identified in the macro cell and the time domain, so as to transmit the common control channel. More specifically, the synchronization channel and/or the essential control information channel of the femto cell and the macro cell may be multiplexed by using a Time Division Multiplexing (TDM) scheme. In this case, for the reliability of the common control channel, the femto base station may perform nulling (or nullification or puncturing) in a region where the common control channel of the macro base station is transmitted (e.g., subframe, OFDM symbol, sub-band, a combination of the subframe, OFDM symbol, and sub-band). In this case, the nulling (or nullification) information may be transmitted through the SFH of the macro base station or the femto base station or may be transmitted through any of the other control channels. Meanwhile, based upon the segment information of the macro base station, the segment that is used by the femto base station for transmitting the common control channel may be actively decided by the femto base station, or may be designated by the macro base station.

Referring to the example of FIG. 6, a macro base station (201) including a target femto base station uses a first time-segment configured in the frequency domain respective to user equipments within the first sector so as to transmit the synchronization channel and the essential control information channel. Meanwhile, the femto base station (300), which is located in the first sector (207a) of the macro cell (205), uses a third time-segment, which is differentiated from the time-segment used by the donor macro base station (201) and/or its neighboring macro base station (202), so as to transmit the synchronization channel and the essential control information channel.

Hereinafter, referring to FIGS. 13~15, a method for transmitting the synchronization channel and the essential control information channel by using a time-segment, wherein the macro cell and the femto cell are differentiated from one another in the time domain, will now be described in detail. To facilitate the understanding of the present invention, the SA-Preamble and the superframe header (SFH) shown in FIG. 6 will be respectively given as the main examples of the synchronization channel and the essential control information channel. Also, to facilitate the description of the present invention, it is assumed that, according to this embodiment of the present invention, the first macro base station (201) and the femto base station (300) are positioned as shown in FIG. 6. In this embodiment of the present invention, a segment for the SFH and a segment for the SA-Preamble may be identified as being physically identical to one another. Additionally, a segment for the SFH and a segment for the SA-Preamble may be identified as segments being physically different from one another yet configured to be identical to one another only logically.

Figure 13:
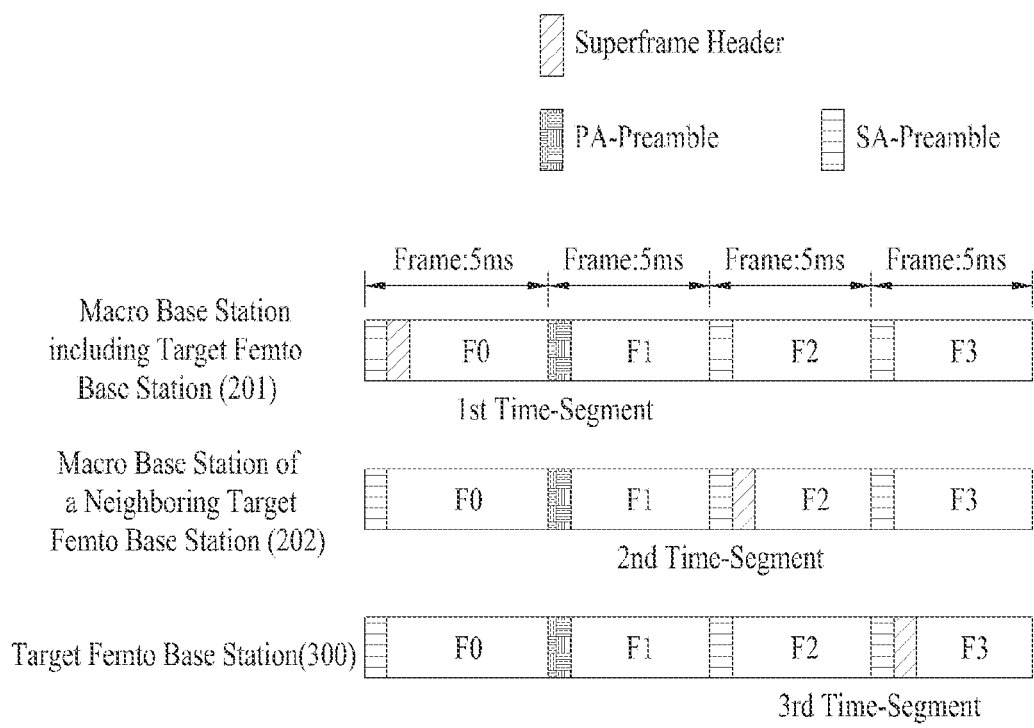

FIG. 13 illustrates an exemplary frame structure according to the embodiment of the present invention. In this embodiment of the present invention, the positions of a synchronization channel and an essential control information channel for the macro base station are fixed, and the positioned of a synchronization channel and an essential control information channel for the femto base station may be adaptively decided within an available segment. In this case, the segment for the femto base station may be decided by taking into consideration a (donor or neighboring) macro base station, a neighboring femto base station, a relay station, and so on. Also, the segment of a femto cell may be signaled by the macro base station. Such signaling may be performed by using the SFH or another channel of the macro base station, or such signaling may also be performed by using backbone signaling.

Referring to FIG. 13, the first macro base station (201) including a target femto base station may transmit a PA-Preamble (including/not including information on the second segment) for the first sector from all Physical Resource Units (PRUs) along a frequency axis and from a first subframe (or some of the symbols) of the second frame along a time axis within the superframe. The first macro base station (201) may transmit the SFH to a first time-segment for the first sector. And, the first macro base station (201) may transmit an SA-Preamble from first~third time-segments.

Meanwhile, the second macro base station (202) including a target femto base station may transmit a PA-Preamble (including/not including information on the second segment) for the second sector from all Physical Resource Units (PRUs) along a frequency axis and from a first subframe (or some of the symbols) along a time axis within the superframe. Also, the second macro base station (202) may transmit an SFH for the second sector to a second time-segment for the SFH. Furthermore, the second macro base station (202) may transmit an SA-Preamble from first~third time-segments.

In the meantime, the femto base station (300) will be described in detail under the assumption that the femto base station (300) is positioned within the first sector of the first macro base station (201), as shown in FIG. 6. The femto base station (300) may transmit a PA-Preamble (including/not including information on the second segment) for a sector identical to that of the first macro base station (201) from all Physical Resource Units (PRUs) along a frequency axis and from a first subframe (or some of the symbols) of the second frame along a time axis within the superframe. Also, in order to avoid interference between the SFHs of the donor first macro base station (201) and its neighboring second macro base station (202), the femto base station (300) may transmit its own SFH to the third time-segment within the superframe.

Figure 14:
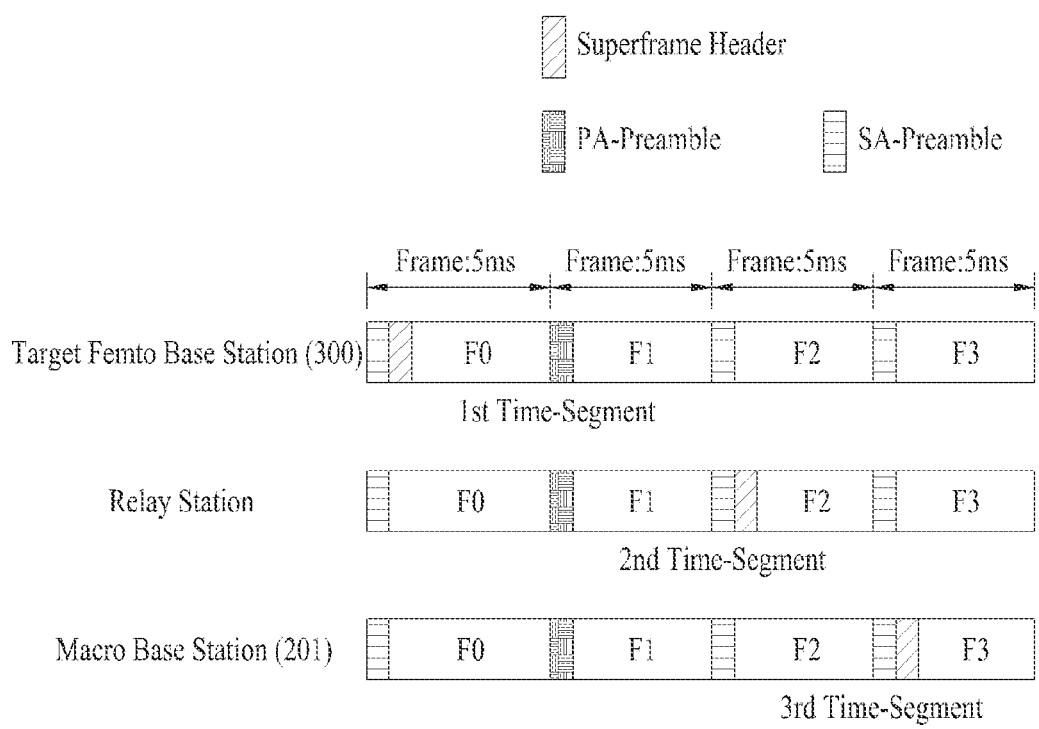

FIG. 14 illustrates an exemplary frame structure according to another embodiment of the present invention. With the exception for the assumption that the system described herein corresponds to a mobile communication system, which includes a macro base station (201), a relay station, and a femto base station (300), FIG. 14 is similar to FIG. 13. Most particularly, FIG. 14 corresponds to a case where the second macro base station (202) of FIG. 13 is replaced with a relay station.

Figure 15:
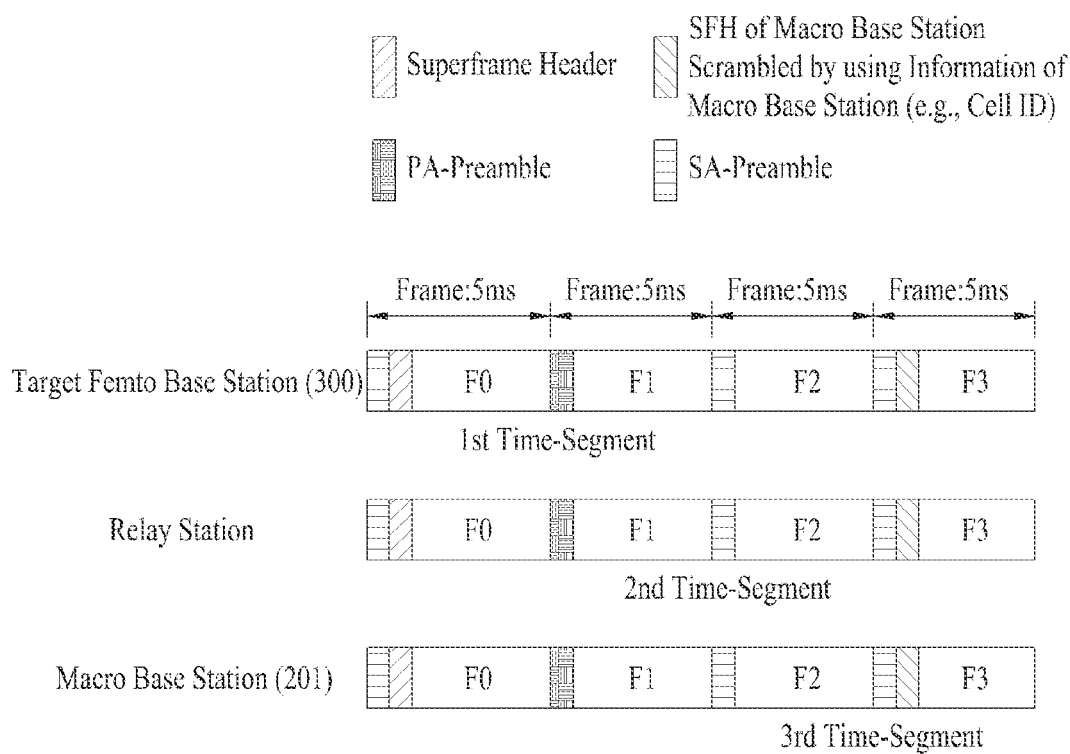

FIG. 15 illustrates an exemplary frame structure according to yet another embodiment of the present invention. FIG. 15 is also similar to the examples described in FIG. 13 and FIG. 14. Herein, the difference is that, among many network nodes (e.g., relay station, femto base station) that can be arbitrarily installed within a macro cell, at least some of the network nodes may additionally transmit the SFH of the macro base station over a time-segment for the macro base station. More specifically, a femto base station and/or a relay not only transmits its own SFH over a time-segment (e.g., time-segments 1, 2), which is differentiated from the macro base station, but may also additionally transmit an SFH of the macro over a time-segment (e.g., time-segment 3) for the macro base station. In order to do so, the femto base station (or relay station) may copy (or duplicate) the SFH of the macro base station and may transmit the copied (or duplicated) SFH of the macro base station over a frequency-/time-segment identical to that of the macro base station. The femto base station and/or the relay station may either acquire information of the macro base station, for example, through the synchronization channel and/or the essential control information channel, via wireless communication, or may acquire the corresponding information through a wired backbone network. In case the femto base station (or relay station) transmits the SFH of the macro base station, the femto base station (or relay station) may scramble the copied SFH of the macro base station by using information of the macro base station (e.g., cell identifier). By having the femto base station and/or the relay station collectively transmit the SFH of the macro base station, a user equipment that is to access the macro base station may acquire a diversity gain.

In order to facilitate the understanding of the present invention, although a method for using different frequency-segments when transmitting the common control channel and a method for using different time-segments when transmitting the common control channel have been separately described, the present invention will not be limited only to the examples given in the description of the present invention. According to the embodiments of the present invention, the common control channel also includes an example of being transmitted by combining the frequency-segment and the time-segment (i.e., frequency/time-combined resource division).

Figure 16:
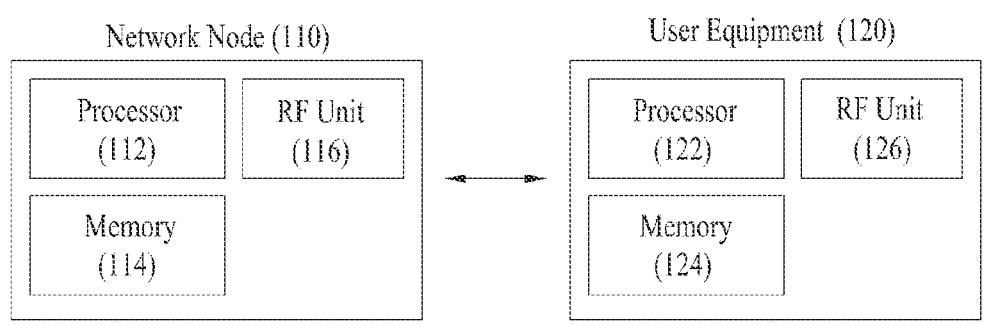
FIG. 16 illustrates an exemplary network node and an exemplary user equipment that can be applied to the present invention.

FIG. 16 illustrates an exemplary network node and an exemplary user equipment that can be applied to the present invention.

Referring to FIG. 16, a mobile communication system includes a network node (110) and a user equipment (UE) (120). Herein, the network node includes a Base Station, and a Relay or Femto Base Station. In a downlink, a transmitter corresponds to a part of the network node (110), and a receiver corresponds to a part of the user equipment (120). In an uplink, a transmitter corresponds to a part of the user equipment (120), and a receiver corresponds to a part of the network node (110). Herein, the network node (110) includes a processor (112), a memory (114), and a Radio Frequency (RF) unit (116). The processor (112) may be configured to realize the processes and/or the methods proposed in the present invention. The memory (114) is connected to the processor (112) and stores diverse information associated with the operations of the processor (112). The RF unit (116) is connected to the processor (112) and transmits and/or receives radio signals. The user equipment (120) includes a processor (122), a memory (124), and an RF unit (126). The processor (122) may be configured to realize the processes and/or the methods proposed in the present invention. The memory (124) is connected to the processor (122) and stores diverse information associated with the operations of the processor (122). The RF unit (126) is connected to the processor (122) and transmits and/or receives radio signals. The network node (110) and/or the user equipment (120) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on. Also, the term User Terminal may be replaced by other terms, such as UE (User Equipment), MS (Mobile Station), MSS (Mobile Subscriber Station), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

Industrial Applicability

The present invention may be applied to mobile communication systems using the femto cell. Most particularly, the present invention may be applied to a method for transmitting a common control channel considering the femto cell and an apparatus for the same.

What is claimed is:

1. A method for transmitting a common control channel to a mobile terminal in a first communication sector among a plurality of communication sectors of a macro base station (BS), the method performed by a femto BS and comprising:
   receiving segment information from the macro BS, the segment information including information related to a first time-segment associated with the first communication sector,
   wherein the first time-segment indicates a group of physical resource units used by the macro BS to transmit a common control channel of the macro BS to the mobile terminal, and
   wherein each of the plurality of communication sectors is associated with at least one time-segment among a plurality of time-segments used by a BS to transmit the common control channel;
   selecting a communication sector from among the plurality of communication sectors except the first communication sector, the selection based on the received segment information;
   selecting a time-segment associated with the selected communication sector, the selection based on the received segment information;
   and
   transmitting a common control channel of the femto BS to the mobile terminal through the selected time-segment.

2. The method of claim 1, wherein, the segment information is received through a backbone network connected with the macro BS.

3. The method of claim 1, wherein, receiving the segment information comprises scanning a synchronization channel transmitted by the macro BS.

4. The method of claim 1, wherein the common control channel of the macro BS includes an SA-Preamble (Secondary Advanced Preamble).

5. The method of claim 1, wherein the common control channel of the macro BS includes a Superframe Header.

6. The method of claim 1, further comprisinq transmitting the common control channel of the macro BS to the mobile terminal through the first time-segment.

7. A femto base station (BS) that transmits a common control channel to a mobile terminal in a first communication sector among a plurality of communication sectors of a macro BS, the femto BS comprising:
   an RF (Radio Frequency) unit configured to receive segment information from the macro BS, the segment information including information related to a first time-segment associated with the first communication sector,
   wherein the first time-seqment indicates a group of physical resource units used by the macro BS to transmit a common control channel of the macro BS to the mobile terminal, and
   wherein each of the plurality of communication sectors is associated with at least one time-segment among a plurality of time-segments used by a BS to transmit the common control channel; and a processor configured to:
select a communication sector from among the plurality of communication sectors except the first communication sector, the selection based on the received segment information;
select a time-seqment associated with the selected communication sector, the selection based on the received segment information; and
control the RF unit to transmit a common control channel of the femto BS to the mobile terminal through the selected, time-segment.

8. The femto base station of claim 7, wherein the segment information is received through a backbone network connected with the macro base station.

9. The femto base station of claim 7, wherein the segment information is received by scanning a synchronization channel transmitted by the macro BS.

10. The femto base station of claim 7, wherein the common control channel of the macro BS includes an SA-Preamble (Secondary Advanced Preamble).

11. The femto base station of claim 7, wherein the common control channel of the macro BS includes a Superframe Header.

12. The femto base station of claim 7, wherein the processor is further configured to control the RF unit to transmit the common control channel of the macro BS to the mobile terminal through the first time-segment.

* * * * *